W. S. GRAHAM.
WHEELED PLOW.
APPLICATION FILED AUG. 19, 1908.
912,307.
Patented Feb. 16, 1909.
4 SHEETS—SHEET 1.
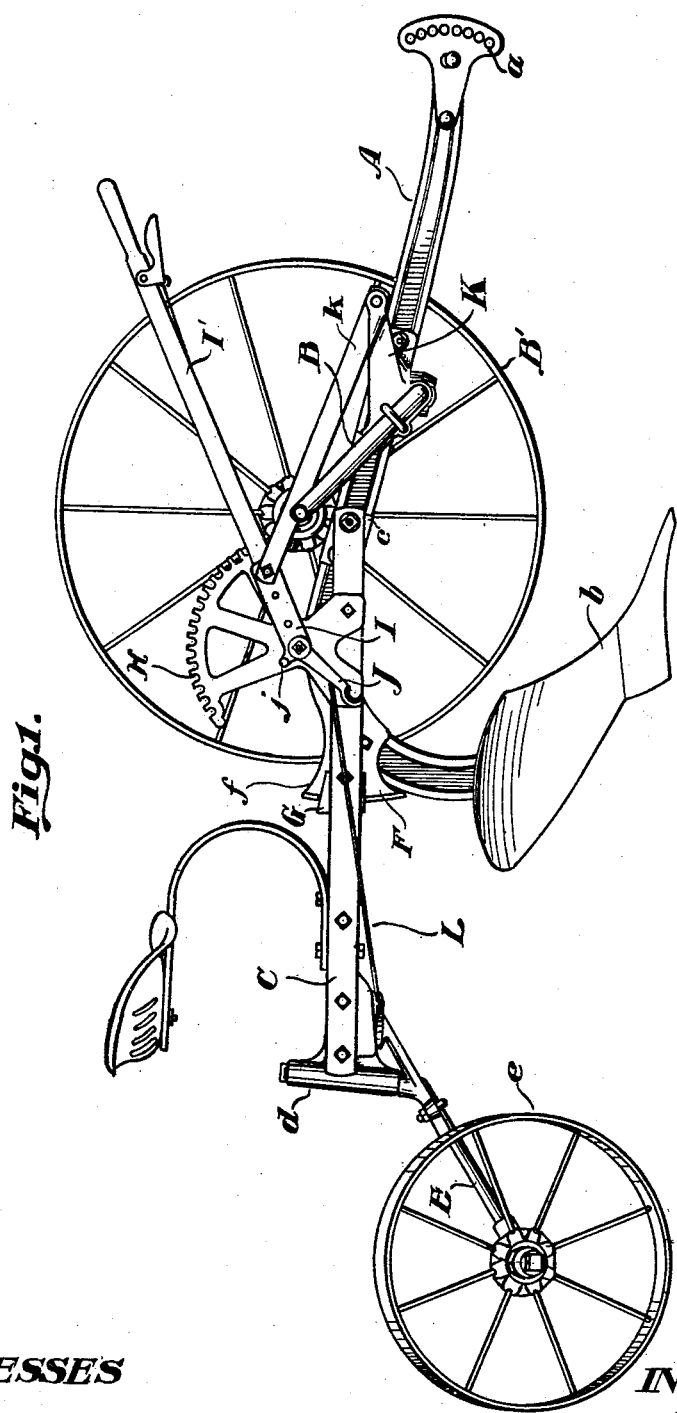
WITNESSES
INVENTOR
William S. Graham

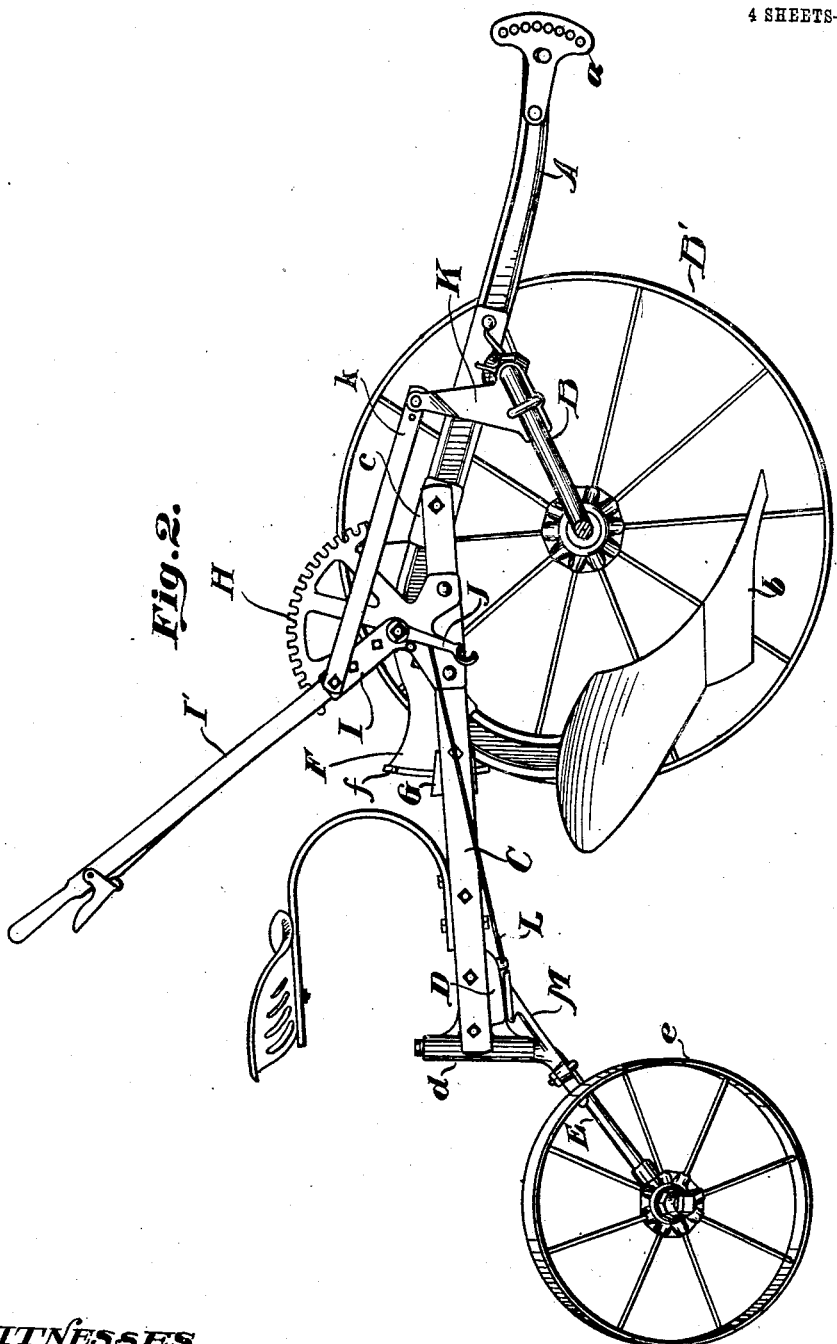

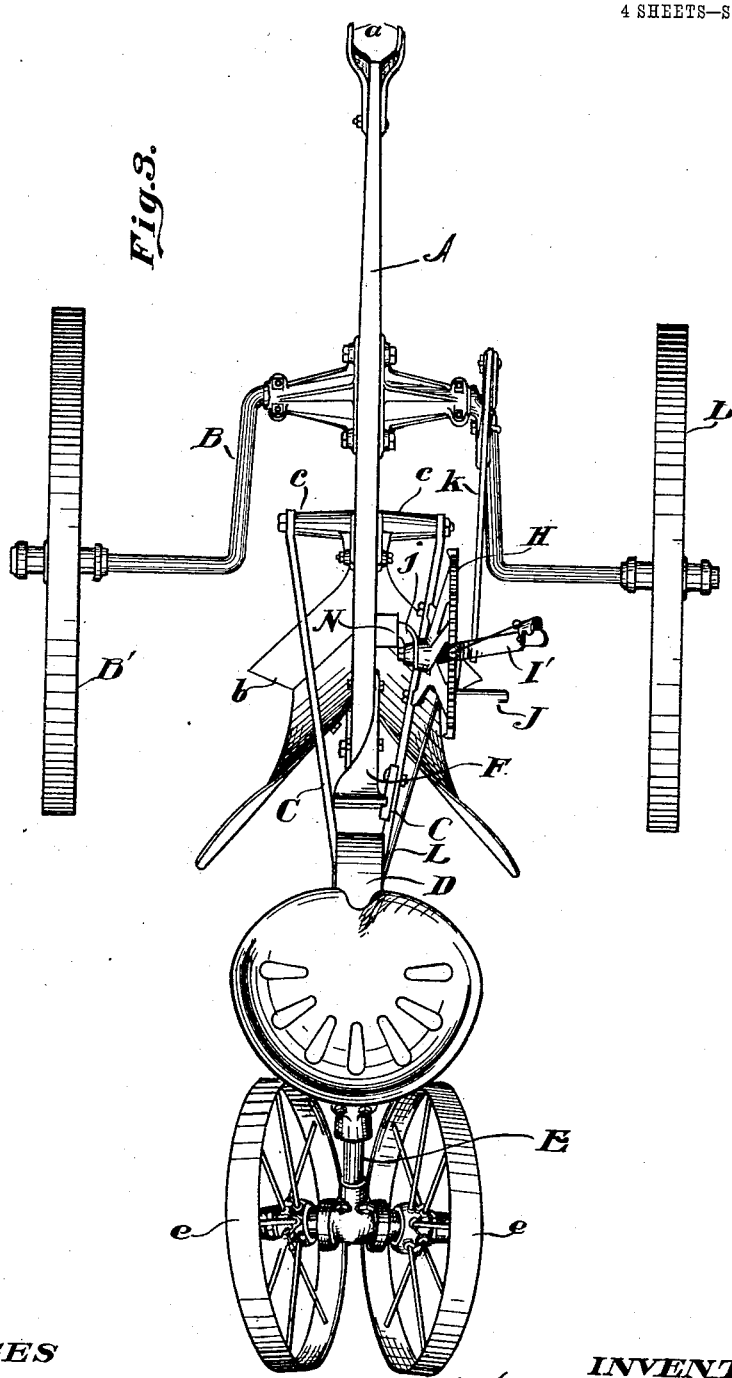

W. S. GRAHAM.
WHEELED PLOW.
APPLICATION FILED AUG. 19, 1908.
912,307.
Patented Feb. 16, 1909.
4 SHEETS—SHEET 4.
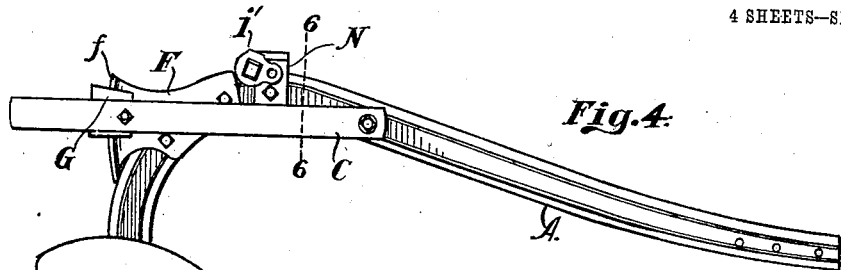
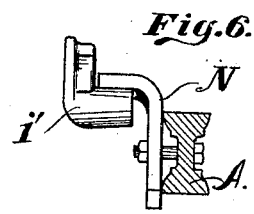
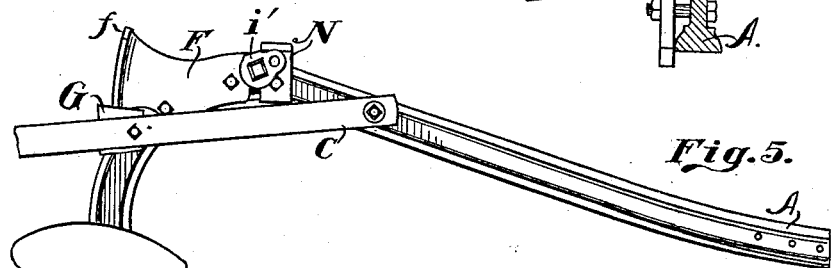
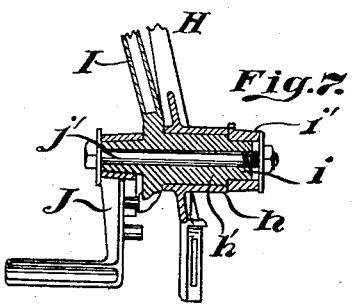
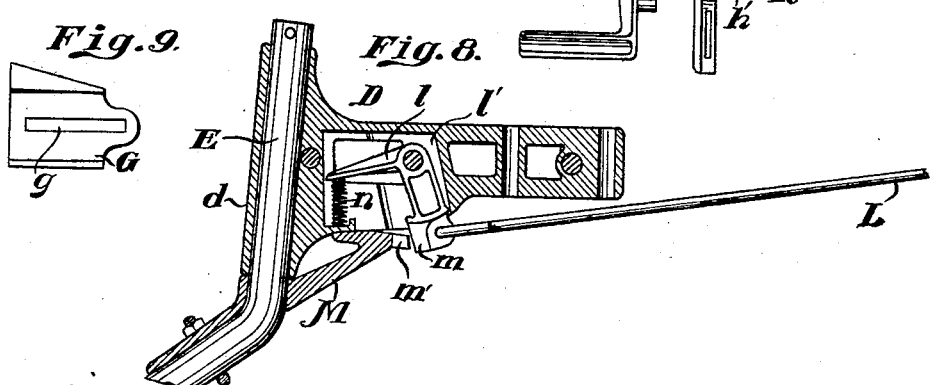

UNITED STATES PATENT OFFICE.

WILLIAM S. GRAHAM, OF CANTON, ILLINOIS, ASSIGNOR TO PARLIN & ORENDORFF COMPANY, OF CANTON, ILLINOIS, A CORPORATION OF ILLINOIS.

WHEELED PLOW.

No. 912,307.           Specification of Letters Patent.           Patented Feb. 16, 1909.

Application filed August 19, 1908. Serial No. 449,343.

*To all whom it may concern:*

Be it known that I, WILLIAM S. GRAHAM, a citizen of the United States, residing at Canton, in the county of Fulton and State of Illinois, have invented certain new and useful Improvements in Wheeled Plows, of which the following is a specification, reference being had to the accompanying drawings.

This invention relates to improvements in wheeled plows and has for one of its objects to provide improved means for raising and lowering the plow-beam whereby the plow bottom or plow proper will be so raised from the ground that it will be supported and held in substantially the same relation to a horizontal line as it assumes when lowered into a working position, thereby insuring every part of the plow's cutting edge being held sufficiently high above the ground to provide ample clearance in transporting the machine to and from the ground to be plowed.

Other objects are to provide improved means for unlocking the rear wheel-axle to permit the caster-wheels carried thereby to swing sidewise; to provide improved means for changing the set or suction of the plow bottom; to provide rigid carrying means for the rear wheels whereby such wheels will be kept in alinement and a rigid structure as a whole be produced; and to improve generally machines of this class.

These objects I attain by the devices and combinations of devices illustrated in the drawings and hereinafter specifically described.

That which I believe to be new will be set forth in the claims.

In the accompanying drawings,—Figures 1 and 2 are side elevations of my improved machine, showing respectively the position of the parts when the plow bottom is lowered and raised. In both the figures the right-hand wheel is removed. Fig. 3 is a top or plan view of the machine. Figs. 4 and 5 are details, each being a side elevation of the plow-beam and the plow bottom carried thereby, showing also a portion of the mechanism employed for causing the raising of the plow bottom in the required manner. A portion of one of the side bars of the frame that supports the rear or caster-wheel axle is also shown. Fig. 4 shows the plow bottom lowered while Fig. 5 shows it raised. Fig. 6 is a detail, showing the means employed for exerting a lift on the plow-beam near its rear and at a point over the plow-beam, the plow-beam itself being in section—the section being taken at line 6—6 of Fig. 4. Fig. 7 is a detail, partly in section, of a portion of the toothed segment and the lower end or socket portion of the operating lever, and parts connected therewith. Fig. 8 is a detail, partly in elevation and partly in vertical section, of the means for effecting the locking and unlocking of the rear axle, and Fig. 9 is a detail of the adjustable plate upon the inclined upper edge of which the bearing block carried by the plow-beam rests.

In the several figures of the drawings in which corresponding parts are indicated by the same reference characters,—A indicates the plow-beam, at the forward end of which is pivotally attached a clevis $a$, as usual, and B indicates an arched axle, of the usual construction, upon the end portions of which are journaled the main carrying wheels B'—B'.

$b$ indicates the plow bottom, secured to the plow beam A in the usual manner.

C—C indicate two similar bars, pivotally connected to two brackets $c$—$c$, that are bolted to and project from opposite sides of the plow-beam A, as shown in Fig. 3. These bars extend toward the rear of the machine, and between their rear ends is bolted a casting D, the rear end of which is an enlarged tubular portion $d$, in which is rotatably mounted the upper end of an axle E that carries at its lower end suitable spindles on which are journaled caster-wheels $e$—$e$.

F is a block bolted to one side of the plow-beam A, which block as clearly shown in Fig. 3, extends over the top of the plow-beam, and is at its rear end sufficiently wider than the plow-beam to come in contact with the inner faces of the rearwardly converging bars C—C, thus acting to prevent any lateral swing of such side bars and the mechanism carried thereby. This block F at one of its rear upper corners has a lateral projection $f$ that will, when the plow proper is in its lowermost position, rest upon the upper inclined edge of another and smaller block G, which is bolted to one of the side bars C. This second mentioned block G is provided with a slot $g$, as shown in Fig. 9, which enables it to be adjusted forward or back as desired, and accordingly as such adjustment is made the depth to which the plow bottom can enter the ground will be regulated, thus affording a simple mechanism for changing the set or suction of the plow.

H indicates a segmental rack bolted to one of the bars C. The lower portion of this rack has formed with it a laterally projecting sleeve (see Fig. 7) in which there is a hub $h'$ formed with a socket member I of the operating hand lever, the other or handle portion of such lever being indicated by $I'$. The operating lever thus turns freely on its hub $h'$. One end of the hub $h'$ is squared as indicated at $i$ and upon this square end is mounted a short arm $i'$ which is thus caused to turn with the turning of the hub $h'$. At the opposite end of the hub $h'$ there is loosely journaled a short foot lever J which is not affected by the movement of the operating hand lever until such hand lever has been turned back into position far enough to cause the pin $j$ to abut against it. The parts carried by the hub $h'$ are held in position by the bolt $j'$.

K is an arm secured rigidly to the arched axle B to the upper end of which arm is pivoted the forward end of a link $k$, the rear end of such link being pivotally connected to the socket member I of the operating lever.

L indicates a rod, the forward end of which is suitably secured to the foot lever J, and the rear end of which is hooked into or otherwise secured to the lower end of the bell-crank lever $l$ that is pivoted in a recess $l'$ in the bracket D that is secured between the rear ends of the bars C—C. In the construction shown the pivot for this bell-crank lever $l$ is formed by one of the bolts used for attaching the bracket D in place. The lower end of this bell-crank lever has formed in it a rearwardly extending tooth $m$ adapted to enter a notch $m'$ that is formed in the forward end of the arm M that is clamped to the axle E below the head portion $d$ of the bracket D. The tooth $m$ is normally held in the notch $m'$ by a coiled spring $n$.

With the machine in operation and with the parts in the position indicated in Fig. 1, wherein the plow bottom is shown in its lowermost position, the caster-wheels $e$—$e$ will be held rigidly in position so as to follow in a direct line behind the plow by reason of the fact that their supporting side bars C—C are prevented from any sidewise motion by reason of contact of their inner faces with the sides of the large block F that is bolted to and overlies the plow-beam A. If the suction of the plow bottom needs to be changed slightly at any time that can be readily effected by loosening the nut on the bolt that holds the smaller block G, carried by one of the side bars C, and adjusting such block backward or forward as may be required, and by reason of the upper edge of this block being inclined, it is apparent that the plow bottom will be set as required. When it is desired to raise the plow out of the ground, a pulling back on the hand-lever $I'$ will of course effect this through the pull exerted by the link $k$ and bracket K on the arched axle, as will be well understood. In addition to the raising of the plow beam through this movement of the arched axle, an additional lift will be given to the rear portion of the plow beam at a point over the plow bottom by reason of the turning of the short arm $i'$ which, as stated, is fast on the squared end $i$ of the hub $h'$ of the lever. The end of this arm during the raising movement comes in contact with the turned upper end of a heavy plate N, that is bolted to one of the faces of the plow-beam A. By this arrangement of parts, the same movement of the operating lever that turns the arched axle causes the raising of the plow-beam near its forward end and also causes a direct lift on such plow-beam directly over the plow bottom, and hence causes such plow bottom to rise evenly out of the ground and be supported when raised in a position above the ground practically similar to that occupied by it when in the ground. By thus elevating the plow bottom, ample clearance is afforded in transporting the machine from place to place. When turning the machine at the end of a furrow, the caster-wheels can be allowed to turn freely as is necessary by the operator pressing on the foot lever J, which foot lever, as stated, swings independently on the hub $h'$, and this movement through the rod L will, as will be readily understood, draw the tooth $m$ forward out of the notch $m'$ which of course acts to permit the axle E that carries the caster-wheels to freely turn. During this act of turning, the plow bottom need not be and generally will not be raised out of the ground. When, however, the plow bottom is raised to its highest point so as to place it in proper position for transportation from place to place, as shown in Fig. 2, the act of turning it into this position will also cause the release of the locking engagement between the tooth $m$ and the notch $m'$, due to the fact that the pin $j$ at the lower end of the operating lever will strike against the rear edge of the foot lever J, and move it forward in the same manner that it would be moved forward by the operator's foot. Thus it will be seen that the caster-wheels can be released so as to turn independently, either by foot pressure, while the plow bottom is in its lower position, or automatically, during the raising of the plow.

What I claim as new and desire to secure by Letters Patent is as follows,—

1. In a wheeled plow, the combination with an arched axle, a pair of supporting wheels therefor and a plow beam pivotally connected with said axle, of a lifting lever, a support for said lever, and means carried by said lever for engaging the plow beam to exert a lifting effect on the plow beam, said lifting means being adapted to operatively engage the plow beam during a portion only of the movement of said lever.

2. In a wheeled plow, the combination with an arched axle, a pair of supporting wheels therefor and a plow beam pivotally connected with said axle, of a device secured to said plow beam and adapted to be engaged for lifting said plow beam, a lifting lever, a support for said lever, and means carried by said lever for engaging said device that is secured to the plow beam, whereby said lever can exert a direct lift on the plow beam, said lifting means being adapted to be brought into operative engagement during a portion only of the movement of said lever.

3. In a wheeled plow, the combination with an arched axle, a pair of supporting wheels therefor and a plow beam pivotally connected with said axle, of a caster-wheel, means for connecting said caster-wheel with the plow-beam, a lifting lever supported from said connecting means, and means connected with said lever for raising said arched axle and at the same time exerting a lifting effect on the rear portion of the plow-beam when the lever is moved, said lifting means being adapted to be brought into operative engagement during a portion only of the movement of said lever.

4. In a wheeled plow, the combination with an arched axle, a pair of supporting wheels therefor and a plow-beam pivotally connected with said axle, of a caster-wheel, a pair of bars connecting said caster-wheel with said plow beam, a lifting lever supported from one of said bars, means connecting said lifting lever and arched axle and a device connected to said lever adapted to exert a lifting effect on the rear portion of the plow-beam when the lever is turned to raise the arched axle.

5. In a wheeled plow, the combination with an arched axle, a pair of supporting wheels therefor and a plow-beam pivotally connected with said axle, of a lifting lever and a support therefor, said lever comprising a horizontally-extending hub portion that is journaled in said support, an arm fixed to and turning with said hub portion, and a device on said plow-beam adapted to be engaged by said arm to effect a raising of the plow-beam, said arm being adapted to operatively engage said device during a portion only of the movement of said lever.

6. In a wheeled plow, the combination with an arched axle, a pair of supporting wheels therefor and a plow-beam pivotally connected with said axle, of a caster-wheel, a frame connecting said caster-wheel with the plow-beam, a lifting lever having at its lower end a horizontally-disposed hub portion journaled in a suitable support mounted on said frame, an arm fixed to and turning with said hub portion, and a device on said plow-beam adapted to be engaged by said arm to effect a raising of the rear end of the plow-beam, said arm being adapted to operatively engage said device during a portion only of the movement of said lever.

7. In a wheeled plow, the combination with an arched axle, a pair of supporting wheels therefor and a plow-beam pivotally connected with said axle, of a caster-wheel, a frame connecting said caster-wheel with the plow-beam, a lifting lever having at its lower end a horizontally-disposed hub portion journaled in a suitable support mounted on said frame, an arm fixed to and turning with said hub portion, a device on said plow-beam adapted to be engaged by said arm to effect a raising of the rear end of the plow-beam, and other means connecting said lever and arched axle.

8. In a wheeled plow, the combination with an arched axle, a pair of supporting wheels therefor and a plow-beam pivotally connected with said axle, of a caster-wheel, a frame connecting said caster-wheel with the plow-beam, locking mechanism for holding the axle of said caster-wheel against turning, a lifting lever having at its lower end a horizontally-disposed hub portion journaled in a suitable support, an arm fixed to and turning with said hub portion, a device carried by said plow-beam adapted to be engaged by said arm to effect a raising of the plow-beam, a foot lever, connected to but independently movable of said lifting lever, and a rod connected with said foot lever and said locking mechanism.

9. In a wheeled plow, the combination with an arched axle, a pair of supporting wheels therefor and a plow-beam pivotally connected with said axle, of a caster-wheel, a frame connecting said caster-wheel with the plow-beam, locking mechanism for holding the axle of said caster-wheel against turning, a lifting lever having at its lower end a horizontally-disposed hub portion journaled in a suitable support, an arm fixed to and turning with said hub portion, a device carried by said plow-beam adapted to be engaged by said arm to effect a raising of the plow-beam, a foot lever loosely supported on said hub at that end opposite to the end carrying said fixed arm, and a rod connected with said foot lever and said locking mechanism.

10. In a wheeled plow, the combination with an arched axle, a pair of supporting wheels therefor, and a plow beam pivotally connected with said axle, of a lifting lever, means connecting said lever with the arched axle, and a device also connected with said lever adapted to operatively engage and lift said plow beam during a portion only of the movement of said lever.

11. In a wheeled plow, the combination with an arched axle, a pair of supporting wheels therefor and a plow beam pivotally connected with said axle, of a caster-wheel, a frame connecting said caster-wheel with the plow beam, said frame comprising two bars, locking mechanism supported between said bars near their rear ends, a lifting lever suitably journaled in a support secured to said bars, a foot lever mounted on the journal of said lifting lever and adapted to turn independently of the lifting lever, a pin on said lifting lever adapted when the lifting lever is turned to strike against and move said foot lever, and a connection between said foot lever and locking mechanism.

12. In a wheeled plow, the combination with an arched axle, a pair of supporting wheels therefor, a plow beam pivotally connected with said axle, a lifting lever and means for connecting said lever and axle, of a caster-wheel, a frame connecting said caster-wheel with said plow-beam, said frame comprising two bars connected at their forward ends with the plow-beam and converging toward the rear, and means carried by the plow-beam near its rear end against which the inner faces of said bars are adapted to bear.

13. In a wheeled plow, the combination with an arched axle, a pair of supporting wheels therefor, a plow beam pivotally connected with said axle, a lifting lever and means for connecting said lever and axle, of a caster-wheel, a frame connecting said caster wheel with said plow beam, said frame comprising two bars, each of which is connected at its forward end to a bracket projecting laterally from the plowbeam, and said bars converging toward the rear, and a block connected to said plow beam and projecting beyond the sides thereof against which block the inner faces of said bars are adapted to bear.

14. In a wheeled plow, the combination with an arched axle, a pair of supporting wheels therefor, a plow beam pivotally connected with said axle, a lifting lever and means for connecting said lever and axle, of a caster-wheel, a frame connecting said caster-wheel with said plow beam, said frame comprising two bars, each of which is connected at its forward end to a bracket projecting laterally from the plow beam, and said bars converging toward the rear, a block connected to said plow beam against which said caster-wheel and frame are adapted to bear, said block being provided with a lateral projection adapted to engage said frame when the plow beam is in lowered position.

15. In a wheeled plow, the combination with an arched axle, a pair of supporting wheels therefor, a plow beam pivotally connected with said axle, a lifting lever and means for connecting said lever and axle, of a caster-wheel, a frame connecting said caster-wheel with said plow beam, an adjustable plate secured to said frame, said plate having an inclined upper edge, and a device carried by the plow beam adapted to rest upon said inclined edge when the plow is in working position.

WILLIAM S. GRAHAM.

Witnesses:
GILMAN ANDERSON,
S. N. ARNOLD.